W. E. DONNELLY & W. L. GOYETTE.
TROLLEY HEAD.
APPLICATION FILED APR. 28, 1908.
910,797.
Patented Jan. 26, 1909.
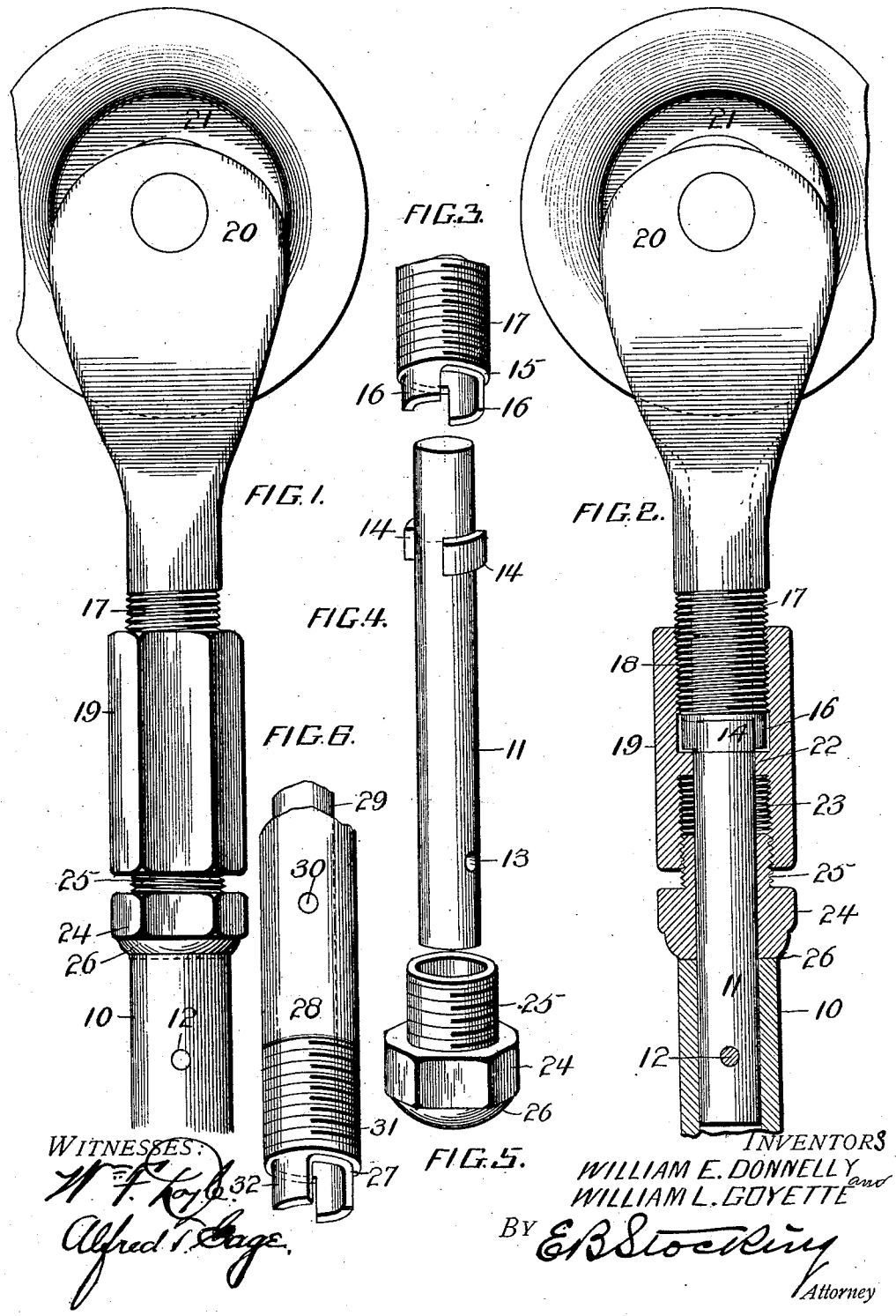
INVENTORS
WILLIAM E. DONNELLY and
WILLIAM L. GOYETTE

UNITED STATES PATENT OFFICE.

WILLIAM E. DONNELLY AND WILLIAM L. GOYETTE, OF CHICOPEE FALLS, MASSACHUSETTS.

TROLLEY-HEAD.

No. 910,797.  Specification of Letters Patent.  Patented Jan. 26, 1909.

Application filed April 28, 1908. Serial No. 429,712.

*To all whom it may concern:*

Be it known that we, WILLIAM E. DONNELLY and WILLIAM L. GOYETTE, citizens of the United States, residing at Chicopee Falls, county of Hampden, and State of Massachusetts, have invented certain new and useful Improvements in Trolley-Heads, of which the following is a specification, reference being had therein to the accompanying drawing.

This invention relates to a trolley head, and particularly to means for detachably securing the trolley wheel holder to the pole so as to permit its removal and replacement whenever desired.

The invention has for an object to provide an interlocked connection between the trolley pole and wheel holder which will prevent rotation of the latter while securely clamping it in position upon the pole by a coupling nut engaging both of the parts.

A further object of the invention is to provide a locking or check nut engaging the coupling and the end of the pole to prevent accidental movement of the coupling nut which would affect the clutched relation of the wheel holder with the pole.

Other and further objects and advantages of the invention will be hereinafter fully set forth and the novel features thereof defined by the appended claims.

In the drawing:—Figure 1 is an elevation of the invention; Fig. 2 is a vertical section thereof; Fig. 3 is a detail perspective of the lower end of the wheel holder; Fig. 4 is a similar view of the connecting pin secured to the pole; Fig. 5 is a detail perspective of the locking nut; Fig. 6 is a similar view of a modified form of the clutch adapted for application to an unthreaded wheel holder.

Like numerals refer to like parts in the several views of the drawing.

The numeral 10 designates the trolley pole which may be of any desired character or configuration, and has secured to the upper portion thereof a projecting pin 11 which may be fastened therein by any desired means, for instance, a cross pin 12 extended through an aperture 13 in the pin. This clutch pin is provided intermediate of its ends with a flange 14, preferably formed in segmental sections separated from each other in order to form an interlocking or clutch member coöperating with the lower end 15 of the head or wheel holder. This end is formed with similar segmental sections 16 adapted to fit between the segmental flanges 14 forming a clutch or interlocking member to prevent rotation of one part upon the other. This lower end of the wheel holder 20 is threaded as shown at 17 to receive the threaded end 18 of the coupling nut 19. The holder is provided with the usual wheel 21. The coupling nut 19 is provided intermediate of its ends with an interiorly disposed flange 22 which is adapted to engage beneath the segmental locking projection 14 of the pin and draw this pin into contact with the projection 16 of the holder when the nut is screwed upward upon the end of the holder thus forming a positive clutch connection between these parts. The lower portion of the coupling nut 19 is interiorly threaded at 23 in an opposite direction to the portion 18 thereof, and mounted thereon is a lock nut 24 having a threaded portion 25 to engage the threads 23. This lock nut has a bearing face 26 which contacts with the upper end of the pole as it is screwed outward from the coupling nut thus effecting a back pressure thereon which effectually locks the nut in its adjusted position.

When an ordinary unthreaded head or wheel holder is used the invention may be adapted thereto by the provision of a separate clutch member 27 adapted to be inserted in the lower portion 28 of the holder, and the shank 29 thereof secured therein by pin 30. This attachment is threaded at 31 and provided with the interlocking members as described in connection with the threaded shank of the holder.

In the operation of the invention it will be apparent that by adjusting the coupling nut the wheel holder and pole are positively clutched and held in relation to each other; and this nut may be further held by means of the locking nut mounted by the oppositely disposed thread therein so as to bind the parts in their adjusted position.

The present invention is adapted to be quickly and readily attached and removed by the simple operation of the coupling nut so as to entirely obviate the necessity of removing the rivets usually used for connecting these parts in their relative position, thus permitting the wheel holder or head to be quickly and easily removed and replaced whenever necessary or desirable.

Having described our invention and set forth its merits, what we claim and desire to secure by Letters Patent is:—

1. In a trolley head, a pole member provided with separated peripherally disposed interlocking means intermediate of its ends, a head having a tubular end to receive one end of said pole member and provided with coöperating interlocking means, and a coupling nut inclosing said means and threaded upon one of said parts to engage and draw the other part into interlocked relation.

2. In a trolley head, a pole having an interlocked extension therefrom, a head having coöperative interlocking means, a coupling nut threaded upon one of said parts and engaging the other to retain them in interlocked relation, and a locking nut threaded in said coupling nut and adapted to engage a relatively fixed part of the pole.

3. In a trolley head, a pole, a coupling pin secured therein and provided with separated peripherally disposed interlocking projections intermediate of its ends, a tubular head adapted to receive one end of said pin and threaded at its lower end, interlocking means carried by the free end of said head in the plane thereof to coöperate with those upon the pin, and a coupling nut threaded upon the head and having a flange to engage said pin.

4. In a trolley head, a pole having an extension therefrom provided with lateral interlocking means, a head having coöperating interlocking means and a threaded lower portion, a coupling nut adapted to engage said means upon the extension and the threads on said head, an oppositely interiorly threaded lower portion upon said coupling nut, and a locking nut threaded in said portion.

5. In a trolley head, a pole having an extension therefrom provided with interlocking means, a head having coöperating interlocking means, a coupling nut threaded upon one of said parts and engaging the other to retain them in interlocked relation, and a locking nut disposed between the pole and said coupling nut to engage and hold each of said parts in adjusted relation.

6. In a trolley head, a pole having an extension therefrom provided with separated segmental flanges, a head having a threaded lower portion and segmental extensions adapted to mesh between said flanges, a coupling nut having a threaded portion to engage said head and an interior flange to engage beneath the flange of said extension, an oppositely interiorly threaded end upon said coupling nut, and a locking nut threaded therein and adapted to engage a portion of said pole.

In testimony whereof we affix our signatures in presence of two witnesses.

WILLIAM E. DONNELLY.
WILLIAM L. GOYETTE.

Witnesses:
JAMES H. LOOMIS,
RUTH H. LOOMIS.